United States Patent
Sosby et al.

(10) Patent No.: US 9,274,613 B2
(45) Date of Patent: *Mar. 1, 2016

(54) METHOD AND APPARATUS PERTAINING TO DYNAMICALLY DETERMINING ENTERED TELEPHONE NUMBERS

(71) Applicant: BlackBerry Limited, Waterloo (CA)

(72) Inventors: David Brandon Sosby, Issaquah, WA (US); My Phuong Thi Vu, Plano, TX (US); Satyam Babu Kothapally, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/303,825

(22) Filed: Jun. 13, 2014

(65) Prior Publication Data

US 2014/0306896 A1  Oct. 16, 2014

Related U.S. Application Data

(63) Continuation of application No. 13/971,140, filed on Aug. 20, 2013, now Pat. No. 8,773,359, which is a continuation of application No. 13/178,831, filed on Jul. 8, 2011, now Pat. No. 8,514,180.

(51) Int. Cl.

| | |
|---|---|
| *G06F 3/02* | (2006.01) |
| *G06F 3/023* | (2006.01) |
| *H04M 1/2745* | (2006.01) |
| *H04W 4/16* | (2009.01) |

(52) U.S. Cl.
CPC ....... *G06F 3/0237* (2013.01); *H04M 1/274558* (2013.01); *H04W 4/16* (2013.01); *H04M 2001/274541* (2013.01)

(58) Field of Classification Search
CPC ......... G06F 3/02; G06F 3/023; G06F 3/0237; H04M 1/275; H04M 1/27558; H04W 4/16
See application file for complete search history.

(56) References Cited

U.S. PATENT DOCUMENTS

| | | |
|---|---|---|
| 4,511,764 A | 4/1985 | Nakayama et al. |
| 6,535,749 B1 | 3/2003 | Iwata et al. |
| 7,072,461 B2 | 7/2006 | Padawer et al. |
| 7,312,410 B2 | 12/2007 | Griffin et al. |
| 7,387,457 B2 | 6/2008 | Jawerth et al. |
| 7,890,146 B2 * | 2/2011 | Kang et al. ................... 455/566 |
| 8,374,846 B2 | 2/2013 | Assadollahi |

(Continued)

OTHER PUBLICATIONS

Scott et al., "Integrated Dialing," U.S. Appl. No. 60/824,431, filed Sep. 1, 2006; 21 pages.

*Primary Examiner* — Joe H Cheng
(74) *Attorney, Agent, or Firm* — Thomas Grzesik; Fleit Gibbons Gutman Bongini & Bianco P.L.

(57) ABSTRACT

As keys of the keyboard of a portable communication device are asserted, the device dynamically determines at least a portion of a corresponding telephone number to present on the device's display by, at least in part, considering likelihoods of differing explicit and implicit interpretations of these key assertions. By one approach this can comprise according a likelihood advantage to an explicit interpretation of one or more of the key assertions and/or implicit interpretations of such key assertions. These likelihood advantages need not be necessarily dispositive with respect to the resultant interpretation.

18 Claims, 8 Drawing Sheets

(56) References Cited

U.S. PATENT DOCUMENTS

| | | |
|---|---|---|
| 8,514,180 B2 | 8/2013 | Sosby et al. |
| 8,538,389 B1 * | 9/2013 | Evans et al. ............... 455/414.1 |
| 2005/0193338 A1 | 9/2005 | Hawkins et al. |
| 2006/0033706 A1 | 2/2006 | Haitani et al. |
| 2006/0236239 A1 | 10/2006 | Simpson et al. |
| 2007/0016862 A1 | 1/2007 | Kuzmin |
| 2008/0056481 A1 | 3/2008 | Scott et al. |
| 2009/0154682 A1 | 6/2009 | Qiu |
| 2009/0158222 A1 | 6/2009 | Kerr et al. |
| 2010/0299636 A1 | 11/2010 | Hawkins et al. |
| 2011/0304552 A1 | 12/2011 | Zhao et al. |
| 2012/0284012 A1 * | 11/2012 | Rodriguez et al. ............... 704/1 |
| 2013/0344920 A1 | 12/2013 | Sosby et al. |

\* cited by examiner

METHOD AND APPARATUS PERTAINING TO DYNAMICALLY DETERMINING ENTERED TELEPHONE NUMBERS

CROSS-REFERENCE TO RELATED APPLICATIONS

This application is a continuation of U.S. patent application Ser. No. 13/971,140 filed Aug. 20, 2013, which is now U.S. Pat. No. 8,773,359 and a continuation of U.S. patent application Ser. No. 13/178,831 filed Jul. 8, 2011, now U.S. Pat. No. 8,514,180, the contents of all of which are incorporated herein by reference in their entireties.

FIELD OF TECHNOLOGY

The present disclosure relates to electronic devices, including but not limited to portable electronic devices having one or more keyboards.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), called pads and tablets, and laptop computers with wireless 802.11-compatible or Bluetooth-compatible capabilities.

Many portable electronic devices have telephonic functionality. In such cases the device will often have at least one character-input keyboard to permit the end user to enter a destination telephone number. Such keyboards often have one or more keys that each correspond to at least two differing characters (such as alphabetic characters, numerical characters, and non-alphanumeric characters). Such devices also often have a display that presents entered telephone number characters.

DETAILED DESCRIPTION

Figure 1:
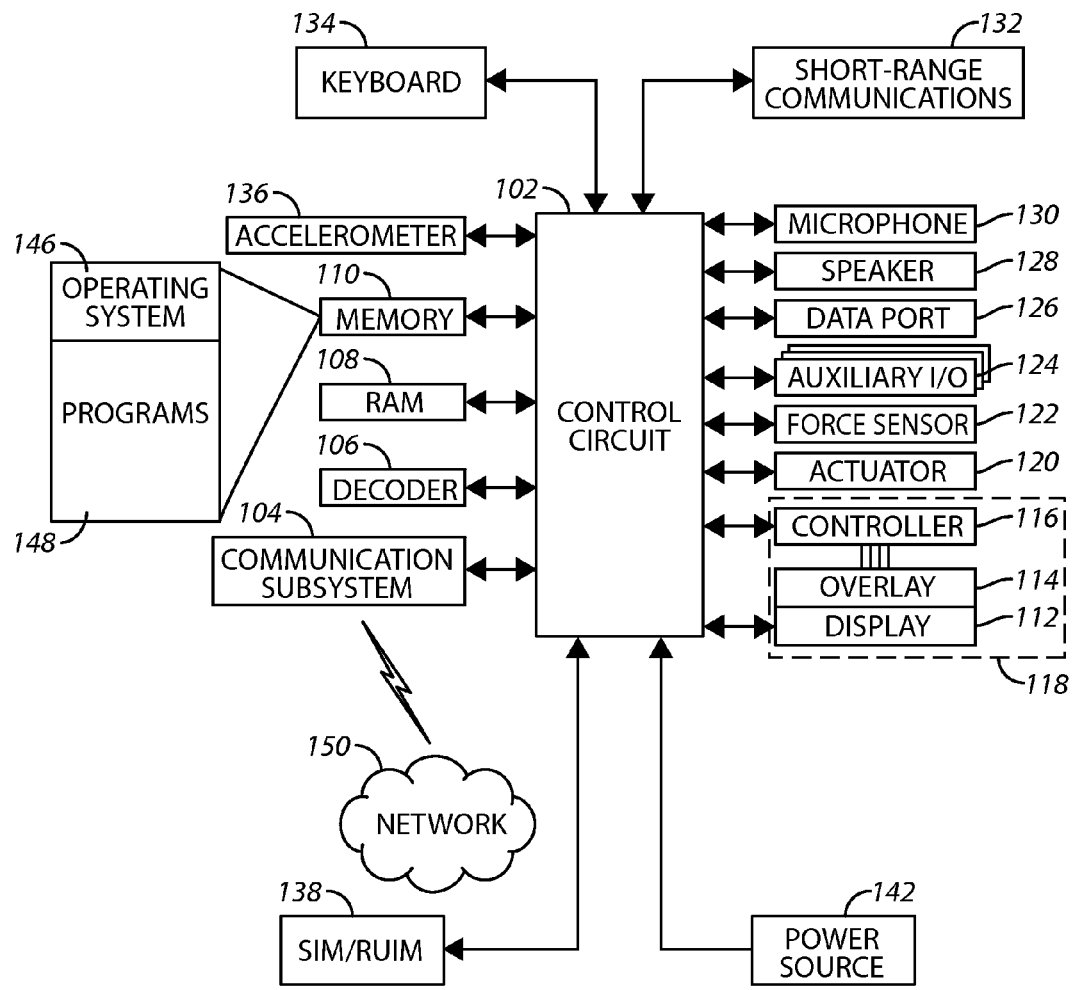
FIG. 1 is a block diagram in accordance with the disclosure.

The following describes an apparatus for and method of dynamically determining entered telephone numbers. This generally includes, as keys of the keyboard of a portable communication device are asserted, dynamically determining at least a portion of a corresponding telephone number to present on the device's display by, at least in part, considering likelihoods of differing explicit and implicit interpretations of these key assertions. By one approach this can include according a likelihood advantage to an explicit interpretation of one or more of the key assertions and/or implicit interpretations of such key assertions. These likelihood advantages need not be necessarily dispositive with respect to the resultant interpretation.

By one approach these teachings will accommodate displaying the corresponding telephone number (in whole or in part) on the display. These teachings will also accommodate, if desired, not displaying a corresponding telephone number on the display upon determining that a telephone number is not likely being presently entered by these key assertions.

These teachings are highly flexible in practice and will accommodate a wide range of application settings. So configured, a portable communication device can permit an end user to enter a telephone number to be called in a manner that is highly intuitive and transparent to that end user. In particular, these disclosed concepts will permit an end user to enter a telephone number at various times in possibly different ways without necessarily requiring significant training or thought regarding specifically how to signal or instruct the device that a telephone number is, indeed, being entered. In some cases these teachings will even tolerate considerable inputting errors on the part of the end user in these regards.

These teachings can also be applied to facilitate determining the specifics of a given entered telephone number. In particular, the various meanings/characters that can be attributed to any given key can be successfully interpreted to identify the actual telephone number being entered (and regardless of whether that "number" includes only numeric characters or at least some alphabetic characters or non-alphanumeric characters as well).

For simplicity and clarity of illustration, reference numerals may be repeated among the figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described. The description is not to be considered as limited to the scope of the example embodiments described herein. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

The disclosure generally relates to an electronic device, which is a portable electronic device in the example embodiments described herein. Examples of portable electronic devices include mobile, or handheld, wireless communication devices such as pagers, cellular phones, cellular smartphones, wireless organizers, personal digital assistants, wirelessly enabled notebook computers, pad and tablet computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a control circuit 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The control circuit 102 interacts with other components, such as Random Access Memory (RAM) 108, memory 110, a display 112 with a touch-sensitive overlay 114 operably coupled to an electronic controller 116 that together include a touch-sensitive display 118, one or more actuators 120, one or more force sensors 122, an auxiliary input/output (I/O) subsystem 124, a data port 126, a speaker 128, a microphone 130, short-range communications 132, and, in this illustrative example, a physical keyboard 134 (such as a QWERTY-style keyboard) including a plurality of user-assertable keys where at least some of the keys each correspond to at least two differing characters.

Depending upon the application setting these differing characters can include characters selected from at least two of alphabetic characters (including both lowercase and uppercase characters as well as alphabetic characters that are not common to the English language such as ö or ú as well as Greek characters or the like), numerical characters, and non-alphanumeric characters (such as but not limited to mathematical operation signs such as + and −, symbols, abbreviations or icons such as &, #, or @ formatting characters, and so forth).

User-interaction with a graphical user interface is performed through the touch-sensitive overlay 114. The control circuit 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the control circuit 102. The control circuit 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the control circuit 102 and are typically stored in a persistent, updatable store such as the memory 110. Such a program (or programs) can serve, for example, to cause the control circuit 102 to carry out and effect any one or more of the functions or actions described herein as desired. Additional applications or programs may be loaded onto the portable electronic device 100 through the wireless network 150, the auxiliary I/O subsystem 124, the data port 126, the short-range communications subsystem 132, or any other suitable subsystem.

A received signal such as a text message, an e-mail message, or web page download is processed by the communication subsystem 104 and input to the control circuit 102. The control circuit 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable contact member, such as a finger, thumb, appendage, or other objects, for example, a stylus, pen, or other pointer, depending on the nature of the touch-sensitive display 118. Multiple simultaneous touches may be detected. Such an approach will serve, for example, to permit an end user to input a telephone number via an on-screen virtual keyboard (as versus via the physical keyboard 134).

The actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the control circuit 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may include one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120.

The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities.

Figure 2:
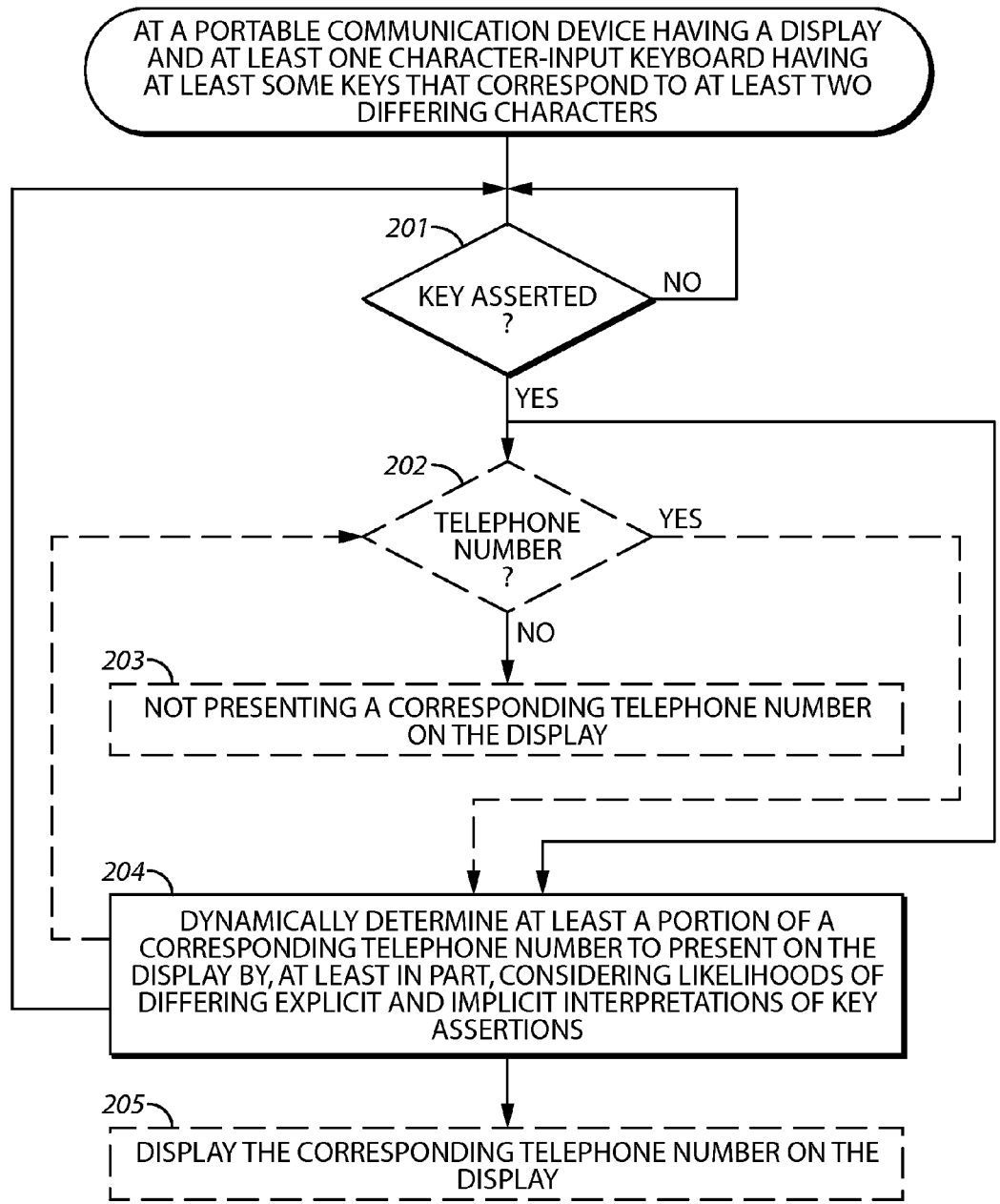
FIG. 2 is a flow diagram in accordance with the disclosure.

The aforementioned control circuit 102 can be programmed to carry out, for example, the method 200 shown in FIG. 2. Generally speaking, this method 200 can be carried out by any of a variety of portable communications devices that include one or more character-entry keyboards. This can include devices having a plurality of keyboards that differ from one another in any of a variety of ways. For example, the keyboards can be different with respect to their user-interface modality (for example, one keyboard can be a physical keyboard including physically-discrete individual keys while another keyboard can include a virtual keyboard that appears on a touchscreen display), their respective number of keys, the keyboard layout, the specific characters that correspond to each key, and so forth. The present teachings will also accommodate use with a character-input keyboard that includes at least one character-specification key (such as a "shift" key or an "alt" key) (where character-specification keys serve to explicitly specify a particular character of a multi-character key).

Pursuant to this method 200 the control circuit 102 determines (typically from time to time while also attending to other necessary or desired functionality) 201 whether such a key has been asserted by an end user. When false, control returns to 201. When true, this method 200 will optionally provide for determining 202 that a telephone number is, or is not, likely being presently entered by the end user. (This determination 202 can be informed by a dynamic determination described below.) Upon determining that a telephone number is not likely being presently entered, this method 200 can optionally respond by not presenting 203 a corresponding telephone number on the display.

Method 200 also provides for dynamically determining 204 at least a portion of a corresponding telephone number to present on the device's display by, at least in part, considering likelihoods of differing explicit and implicit interpretations of the detected key assertions. This can occur as the end user enters the characters as well as at the conclusion of entering the characters.

If at 201 it is determined that a key has been asserted (and the optional step 202 is not executed), the dynamic determination at 204 is next executed. After the dynamic determination at 204 is executed, control returns to 201 or optionally to 205.

If the optional step 202 is executed and it is determined at 202 that a telephone number is likely being presently entered by the end user, the dynamic determination at 204 is next executed. After the dynamic determination at 204 is executed, control returns to 202 or optionally to 205.

By one approach this can include according one or more likelihood advantages to explicit interpretations of key assertions (as correspond to individual key assertions and/or to sequences of key assertions). Such a likelihood advantage, however, need not necessarily be dispositive. That is, this likelihood advantage does not necessarily need to be so significant or of such a magnitude as to essentially force an interpretation result in favor of an explicit interpretation regardless of any other considerations or possibilities.

This activity can include, if desired, dynamically determining at least a portion of a corresponding telephone number to present on the device's display with each assertion of the aforementioned keys (at least when a telephone number is likely being entered). This might include, for example, displaying a first character of a telephone number upon detecting a first key assertion, and then displaying a first two characters of a telephone number upon detecting a second, follow-up key assertion, and so forth.

These teachings will accommodate taking account of any of a variety of factors and considerations when assessing the aforementioned likelihoods. Generally speaking, in many cases it can be useful to provide a likelihood advantage when an explicitly-interpreted input is determined to be inadequate for what at least appears to be a primary purpose of the data entry activity (such as searching), such that one can reasonably surmise that the secondary purpose of dialing a telephone number is the intended operation and hence worthy of a likelihood advantage. Some useful examples in these regards are:

providing a likelihood advantage in favor of an explicit interpretation that corresponds to an ordinary and primary character assignment for a given key (for example, the letter "w" may be viewed as the ordinary and primary character assignment for a key that permits entering either the letter "w" or the number "1");

providing a likelihood advantage in favor of an explicit interpretation that corresponds with an end-user's use of a character-specification key;

providing a likelihood advantage in favor of a particular alphabetic string when that string corresponds to the spelling of a recognized word;

providing a likelihood advantage as a function of the end user using a particular keyboard to enter their characters (such as a telephone-keypad style of keyboard as versus a QWERTY-style keyboard);

providing a likelihood advantage in favor of an explicitly-interpreted string that matches a string contained, for example, as a contact entry in an address book in the portable communications device;

providing a likelihood advantage in favor of an explicitly-interpreted string that matches a string in a called/calling number history log for the portable communications device;

providing a likelihood advantage in favor of an implicitly-interpreted string that does not return an explicitly-interpreted search result.

A number of such possibilities are included in the following pseudo code expression of such an approach. (No specific limitations are intended by way of the specificity of these examples.)

```
function onKeypress(keycode):
    explicitEntry       = getTextFromSearchBox( )
    explicitEntryLikelihood = determineLikelihoodIndex(explicitEntry, true)
    implicitBuffer      = getBestImplicitBuffer(keycode)
    bestImplicitEntry   = implicitBuffer[0]
    bestImplicitLikelihood = implicitBuffer[1]
    if explicitEntryLikelihood > bestImplicitLikelihood:
        bestEntry       = explicitEntry
```

```
            bestEntryLikelihood = explicitEntryLikelihood
         else:
            bestEntry          = bestImplicitEntry
            bestEntryLikelihood = bestImplicitLikelihood
         if bestEntryLikelihood > LIKELIHOOD_CUTOFF:
            displayDialableNumber(bestEntry)
         else:
            hideDialableNumber( )
    function getBestImplicitBuffer(keycode):
       //Queries the keyboard for all possible meanings of a keypress,
       //then evaluates each with the previous input to determine the
       //most likely buffer to be dialed
       listOfPossibleCharacters = getAllPossibleCharactersFromKeyboard(keycode)
       bestImplicitBuffer = NONE
       bestLikelihood    = DEFAULT_LIKELIHOOD
       if previousImplicitBuffer == NONE:
          previousImplicitBuffer = new EmptyBuffer( )
       foreach character in listOfPossibleCharacters:
          tempBuffer = getCopyOfBuffer(previousImplicitBuffer)
          appendCharacterToBuffer(character, tempBuffer)
          likelihood = determineLikelihoodIndex(tempBuffer, false)
          if likelihood > bestLikelihood:
             bestImplicitBuffer = tempBuffer
             bestLikelihood    = likelihood
          previousImplicitBuffer = bestImplicitBuffer
          return {bestImplicitBuffer, bestLikelihood}
    function determineLikelihoodIndex(buffer, isExplicit):
       index = DEFAULT_LIKELIHOOD
       foreach character, position in buffer:
          if is VirtualKeyboard(getCurrentKeyboard( )) and not isExplicit:
             if not characterIsDisplayedOnCurrentKeyboard(character):
                //Users don't like the software implying things with Virtual Keyboard
                index = index - KEY_NOT_DISPLAYED_WEIGHT
          if character is NUMERIC_CHARACTER:
             index = index + NUMERIC_CHARACTER_WEIGHT
          else if character is ALPHA_CHARACTER:
             index = index + ALPHA_CHARACTER_WEIGHT
             positionModifier = 0
             if position > ALPHA_CHARACTER_IDEAL_LOCATION
                positionModifier = ALPHA_CHARACTER_IDEAL_LOCATION_WEIGHT
             else if position == FIRST_CHARACTER_POSITION
                positionModifier = FIRST_CHARACTER_POSITION_WEIGHT
             index = index + POSITION_MODIFIER
          else if character is FORMATTING_CHARACTER:
             if character is '+':
                if position == 0:
                   index = index + PLUS_AT_FIRST_POSITION_WEIGHT
             index = index + FORMATTING_CHARACTER_WEIGHT
          else:
             return NOT_A_NUMBER_LIKELIHOOD
       if getRatioNumbersToOthers( ) > NUMBER_RATIO_CUTOFF:
          //High number ratio
          index = index + HIGH_NUMBER_RATIO_WEIGHT
       if getCurrentKeyboard( ) is one of PHONE_KEYBOARDS:
          //Up the weight for certain keyboards that are used more for dialing
          index = index + PHONE_KEYBOARD_WEIGHT
       numberOfCharactersOverIdealLength = length(buffer) -
    DIALABLE_NUMBER_IDEAL_LENGTH
       if numberOfCharactersOverIdealLength > 0
          //The longer the buffer, the less likely it is that this is a number
          index = index - (numberOfCharactersOverIdealLength *
    DIALABLE_NUMBER_LENGTH_PERCENTAGE_MODIFIER)
       if isExplicit:
          index = index + EXPLICIT_ENTRY_MODIFIER_WEIGHT
       return index
```

As noted above, the device may include more than one character-entry keyboard. One keyboard, for example, may include a QWERTY-style keyboard while another keyboard might include a keyboard specifically intended for entering telephone numbers. In such a case, the dynamic determination 204 of the telephone number can include dynamically determining at least a portion of a corresponding telephone number to present on the display by, at least in part, considering likelihoods of differing explicit and implicit interpretations of key assertions in view of which one of the plurality of character-entry keyboards is being used to enter the key assertions. As an example, when the end user employs a telephone number-entry keypad, the likelihood of the explicit interpretation being correct can be higher than when the end user employs a QWERTY-style keyboard.

This method 200 then optionally provides for displaying 205 the corresponding telephone number (in whole or in part) on the display. By one approach this can include displaying only the most likely interpretation result to the exclusion of other candidate (but less likely) telephone number interpretations. As another approach, in lieu of the foregoing or in combination therewith, this can include displaying both the corresponding telephone number and an explicit interpretation of the key assertions (which explicit interpretation may, or may not, be the same as the otherwise-interpreted corresponding telephone number).

When displaying the corresponding telephone number, by one approach the number can be displayed as a literal number (such as, for example, "1 800 356-9377"). These teachings will also accommodate, however, displaying a telephone number that is at least partially alphabetic (either alone or in combination with literal numeric characters) (such as, for example, "1800FLOWERS").

For the sake of illustration but without intending any particular limitations in these regards, a number of specific examples are now set forth. Many of these examples presume use of a portable communications device 100 having a touch-screen display 118 and a slide-out physical QWERTY-style keyboard 134 where at least the latter has at least some keys that correspond to at least two differing characters and where the keyboard 134 also includes at least one character-specification key.

EXAMPLE 1

Figure 3:
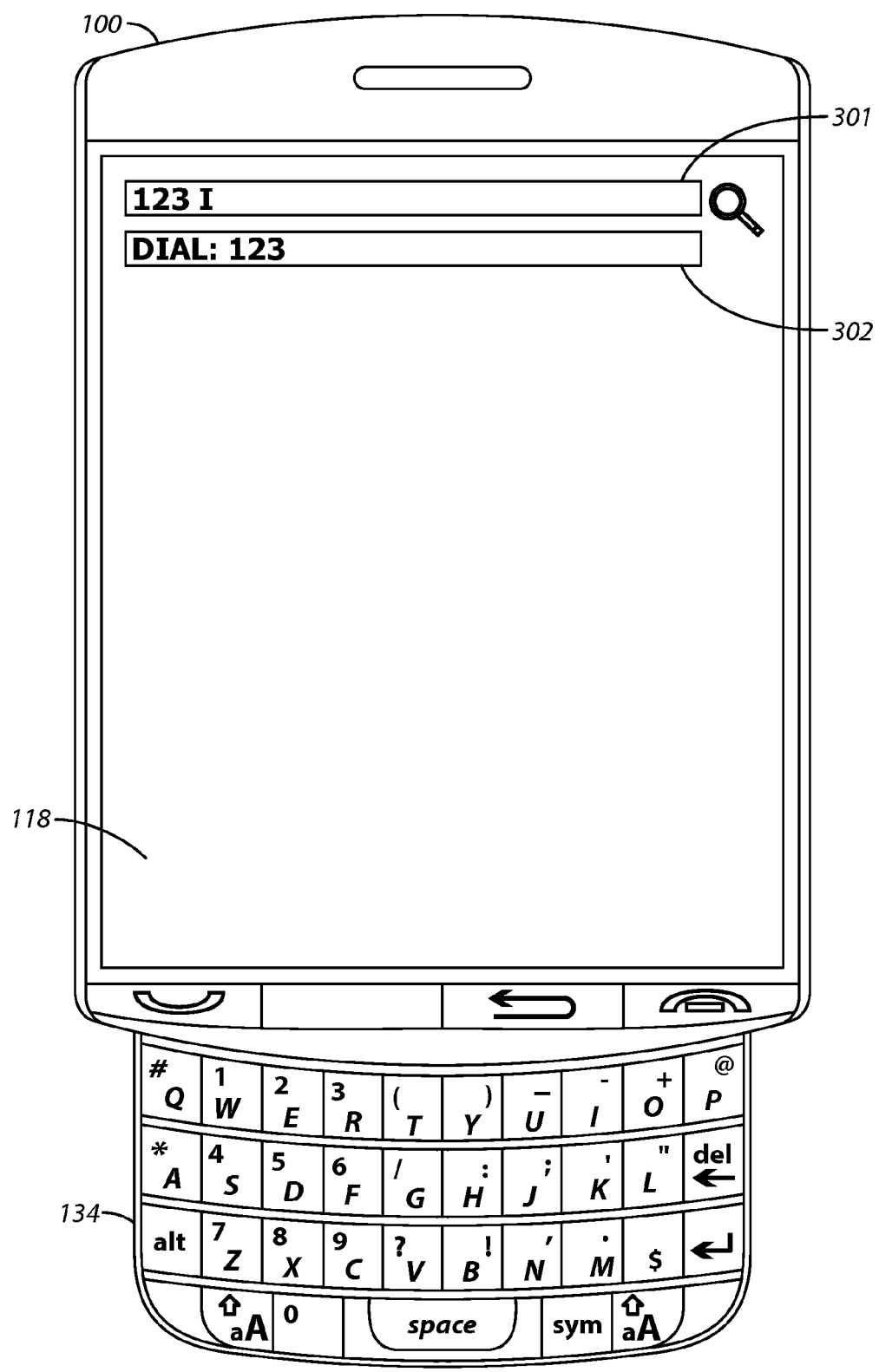
FIG. 3 is a top plan diagram in accordance with the disclosure.

In the example shown in FIG. 3, the user has pressed, in sequence, the keys for "w," "e," and "r" while also first asserting the "alt" character-specification key in each instance. A first display area 301 displays the characters "123" as corresponds to the explicit interpretation of these key assertions (where "1," for example, is the explicit meaning of first asserting the "alt" key and then asserting the "w" key). This first display area 301 includes a search entry text field. The display 118 also presents a dialable telephone number field 302 that also presents, in this example, the numbers "123." In this case, the device 100 determines that these numbers have the greatest likelihood of being an intended telephone number (presuming that the user is, in fact, entering a telephone number to be called).

This approach to entering a telephone number is relatively unambiguous. This approach also, however, requires the end user to assert two keys for each entered number. The applicant has determined that this may not suit the needs of all end users or necessarily reflect the number-entry behavior of all end users all of the time.

EXAMPLE 2

Figure 4:
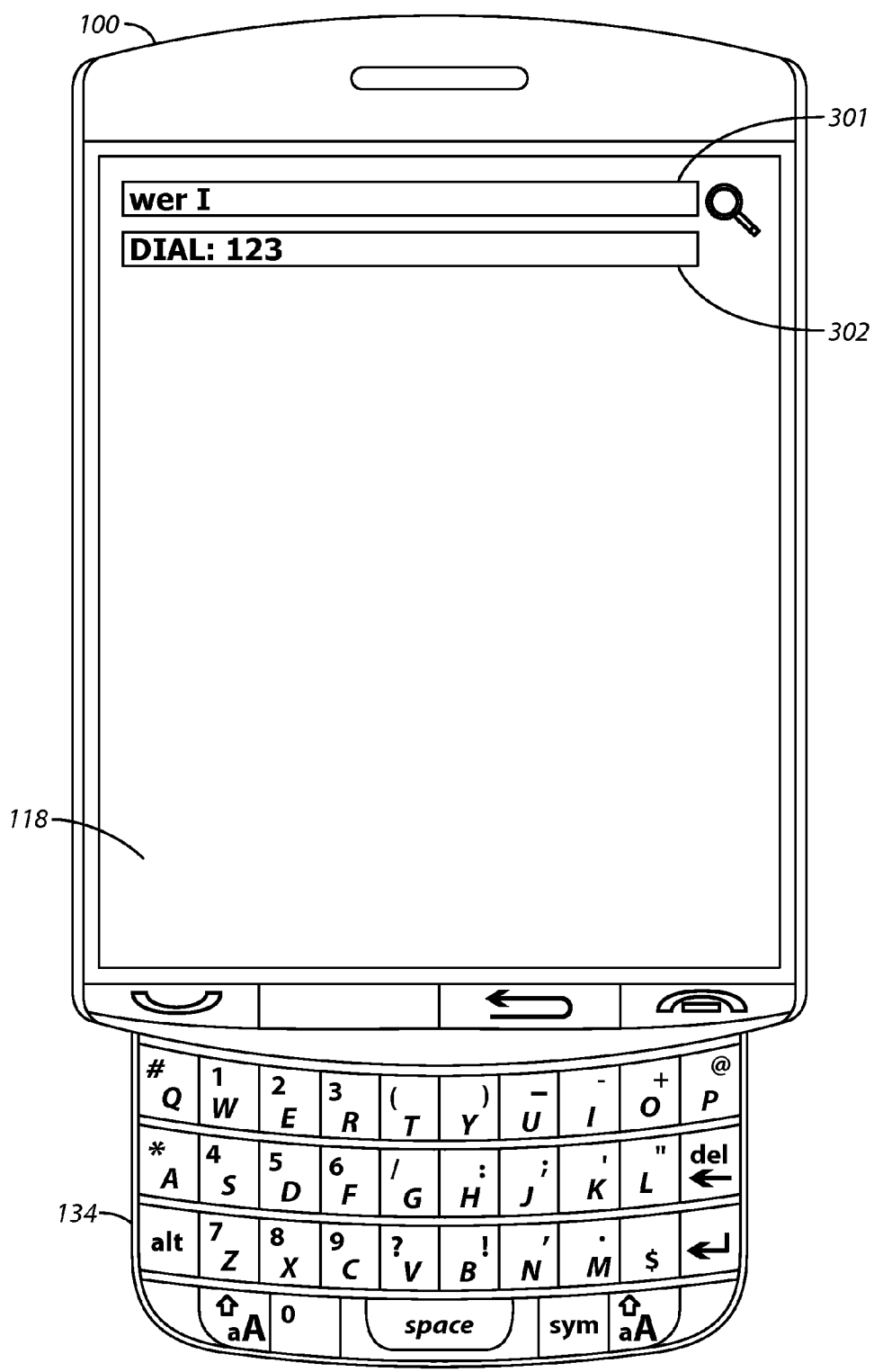
FIG. 4 is a top plan diagram in accordance with the disclosure.

Referring now to FIG. 4, the end user in this example has sequentially pressed the keys for "w," "e," and "r." In this example the end user has only asserted these three keys (so far) and did not employ the "alt" character-specification key as in Example 1. The explicit entries as corresponding to these keys appear in the search entry text field 301 (i.e., the characters "wer"). In this case, however, the device 100 concludes that the presently most-likely telephone number (presuming that these entries do represent a telephone number) are the numbers "123" that each correspond to these particular key assertions.

As noted above, an explicit interpretation of a key assertion can receive a likelihood advantage but that this advantage need not be dispositive. This Example 2 illustrates such a case where the explicit interpretation, though accorded such an advantage, nevertheless loses for the moment to an implicit interpretation.

That said, it remains possible that the end user is dialing a telephone number represented by the alphabetic characters "wer" (in which case the actual telephone numeric counterparts would ultimately of course be "937" and not "123"). At this point in the number-entry process the device 100 is concluding that the number sequence "123" is the most likely telephone number being entered but these teachings will accommodate also buffering the "wer" possibility. This, in turn, can facilitate subsequently displaying a "wer"-based telephone number should that interpretation gain the greater likelihood as the end user continues to enter characters.

If desired, these teachings will optionally accommodate also displaying alternative telephone numbers (such as the "wer" possibility in the instant example). Candidates having a lower likelihood can be displayed, for example, lower on the display 118 to denote that status.

EXAMPLE 3

Figure 5:
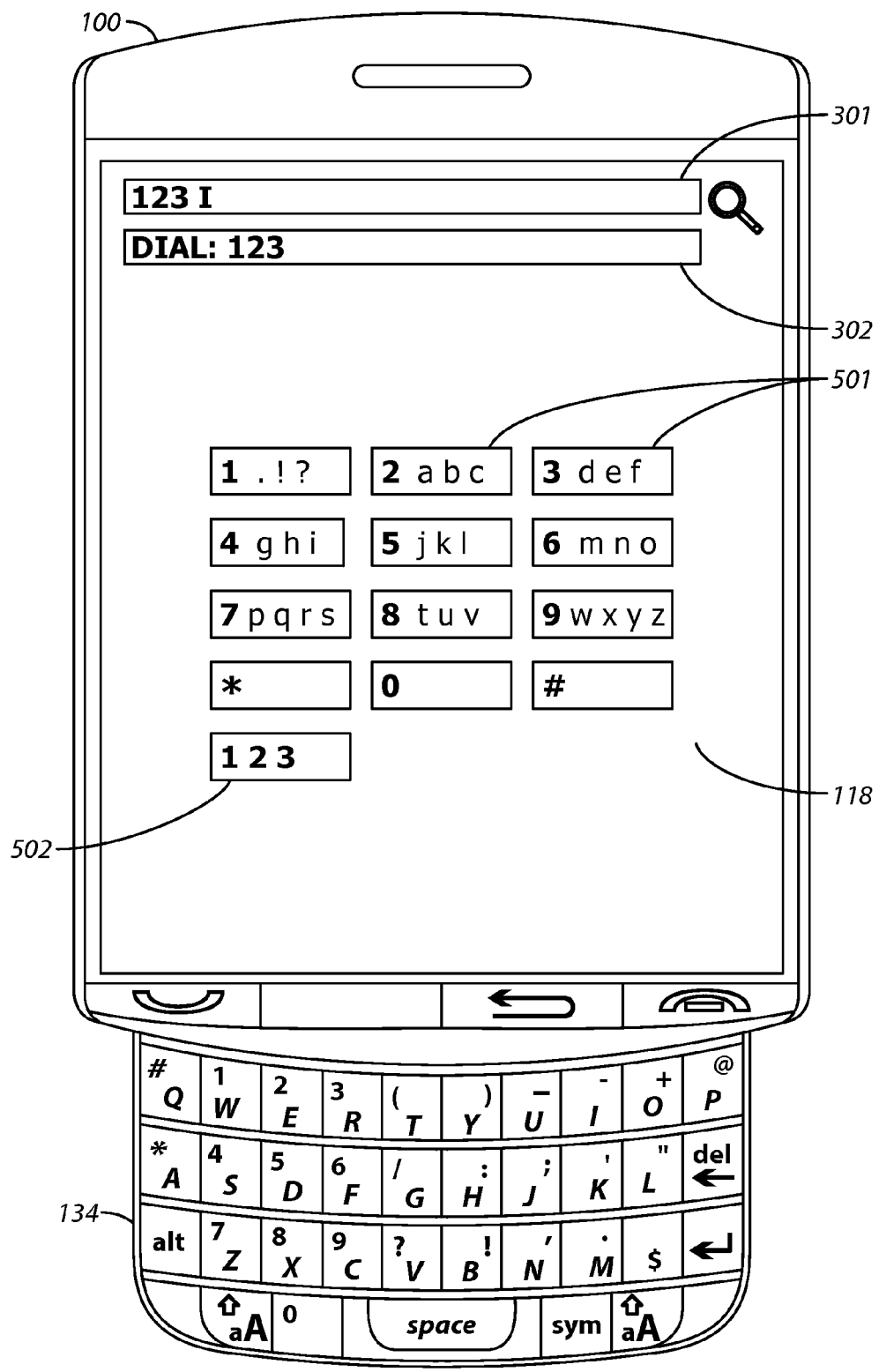
FIG. 5 is a top plan diagram in accordance with the disclosure.

Referring to FIG. 5, in this example the end user asserts keys for a telephone keypad-styled keyboard 501 presented on the device's touch-screen display 118. This example also presumes that the end user selected a numbers-selection mode (via, for example, a corresponding button 502). In this case, asserting the keys for "1," "2," and "3" results in the sequence "123" appearing in both the search entry text field 301 and in the dialable telephone number field 302. Here, the explicit interpretation prevails because the likelihood associated with an explicit interpretation exceeds that of any implicit interpretation.

That said, however, the device 100 can again maintain one or more implicit interpretations in a buffer. This is because a subsequent key assertion may result in an overall net likelihood that then favors an implicit interpretation. If and when this occurs, that more-likely implicit interpretation will then be displayed in the dialable telephone number field 302.

EXAMPLE 4

Figure 6:
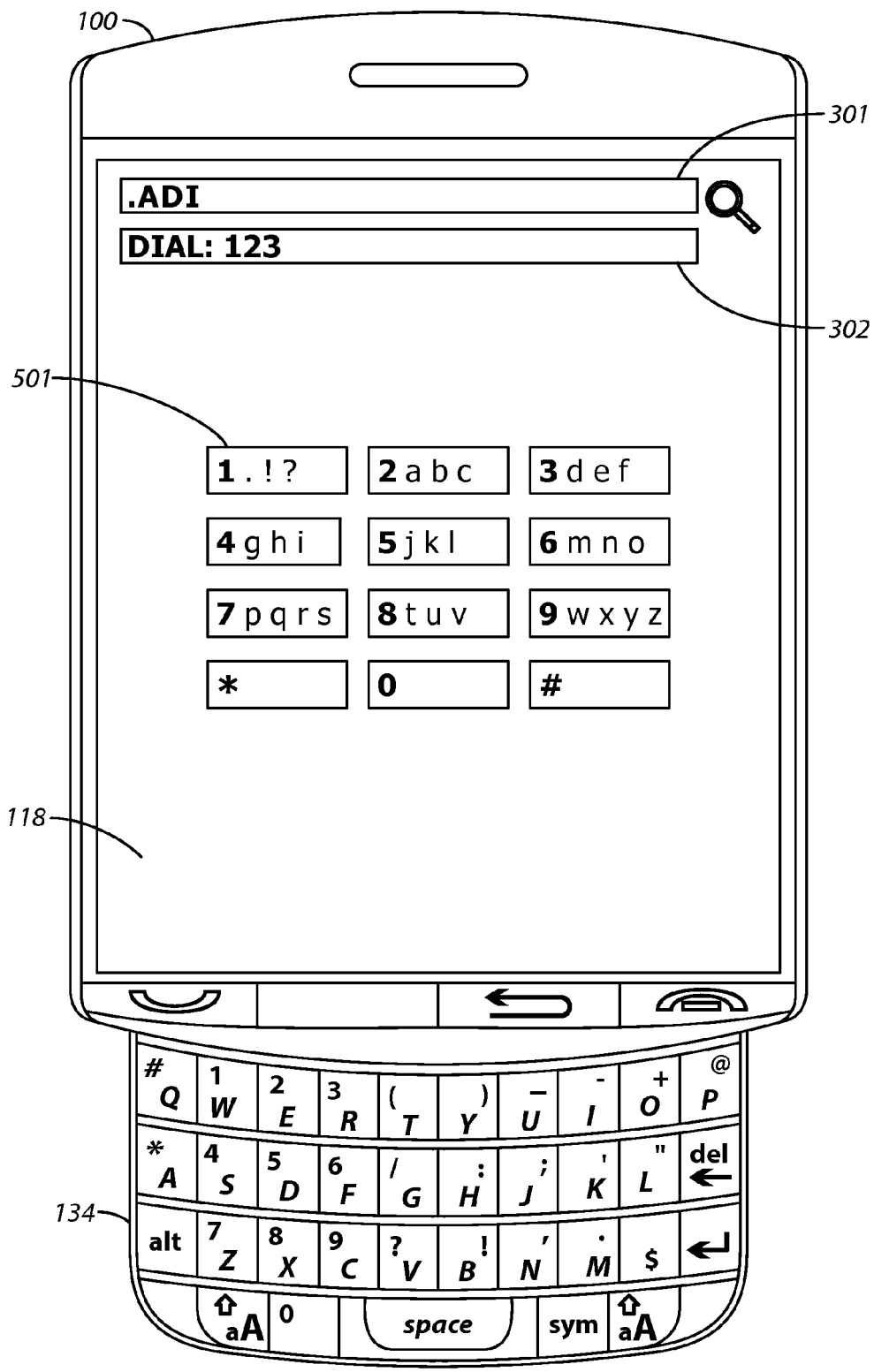
FIG. 6 is a top plan diagram in accordance with the disclosure.

In the example shown at FIG. 6, the end user again asserts keys on a telephone-keypad style of keyboard 501. In this case, however, the end user has not selected a numbers-selection mode of entry. Accordingly, the characters shown in the search entry text field 301 are ".ad". In this case, however, the implicit interpretation (i.e., "123") is more likely than an explicit interpretation at least because the initial character "." of the explicit interpretation is so unlikely to be a part of a telephone number. Accordingly, it is the implicit interpretation "123" that the device presents in the dialable telephone number field 302 at this time during the character-entry process.

EXAMPLE 5

Figure 7:
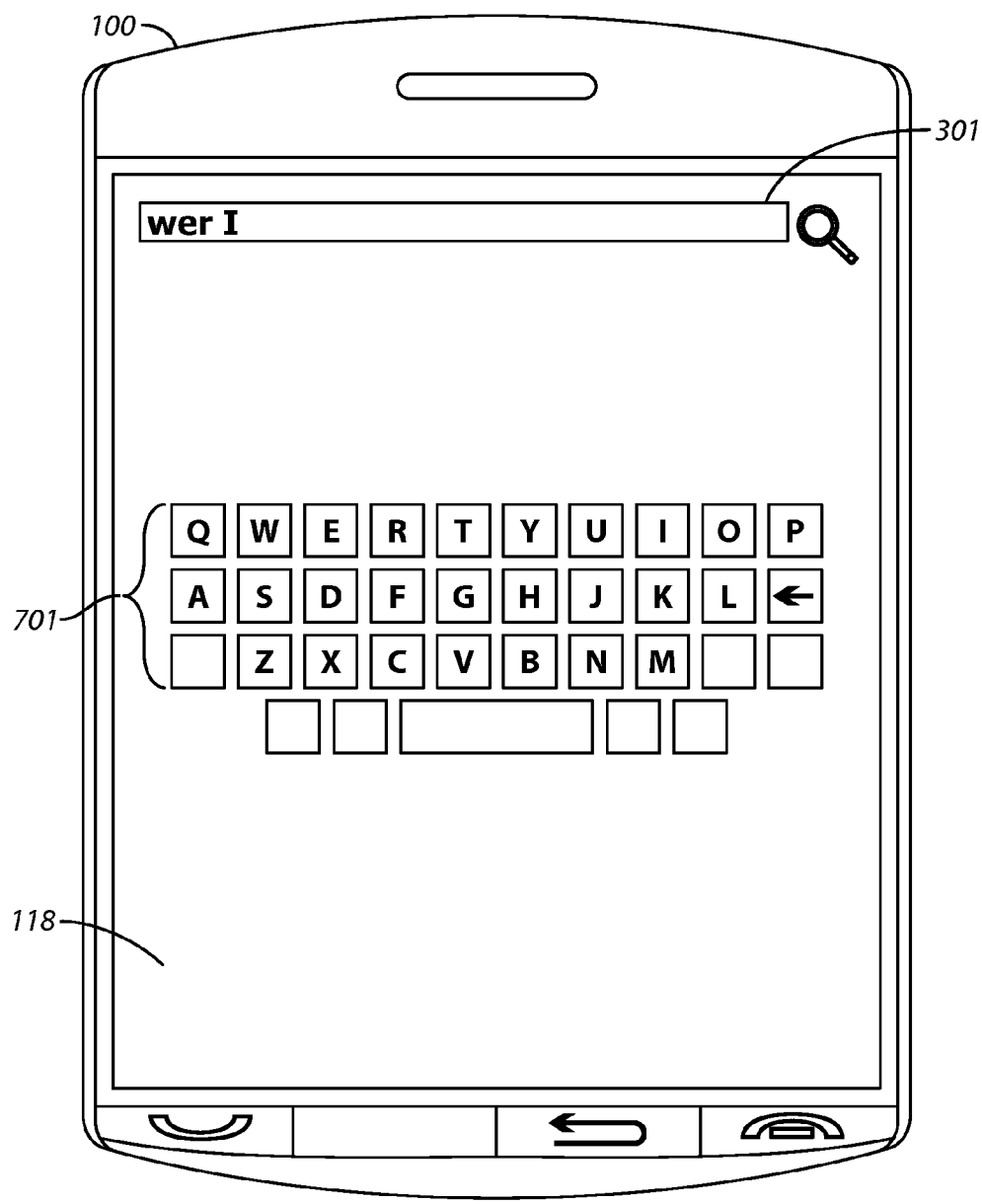
FIG. 7 is a top plan diagram in accordance with the disclosure.

Referring to FIG. 7, in this example the end user employs a virtual keyboard 701 that features, at least for the most part, only a single alphabetic character per key. The likelihood of an end user employing such a keyboard to dial a telephone number is remote. Accordingly, when the end user asserts the keyed sequence "wer," the device 100 presents this string in the search entry text field 301 but does not display any corresponding dialable telephone number at all. (Again, if desired, the device 100 can buffer these explicit interpretations in the event that it becomes more likely during the course of these key assertions that the end user is entering a telephone number, in which case the explicit interpretation can be displayed as a dialable telephone number.)

If this virtual keyboard 701 displayed, instead, only a single numeric character per key, then a different approach would be appropriate. In particular, the explicitly-interpreted numeric sequence (such as "123") asserted by the end user could be simultaneously presented in both the search entry text field 301 and in a dialable-number field as before.

EXAMPLE 6

Figure 8:
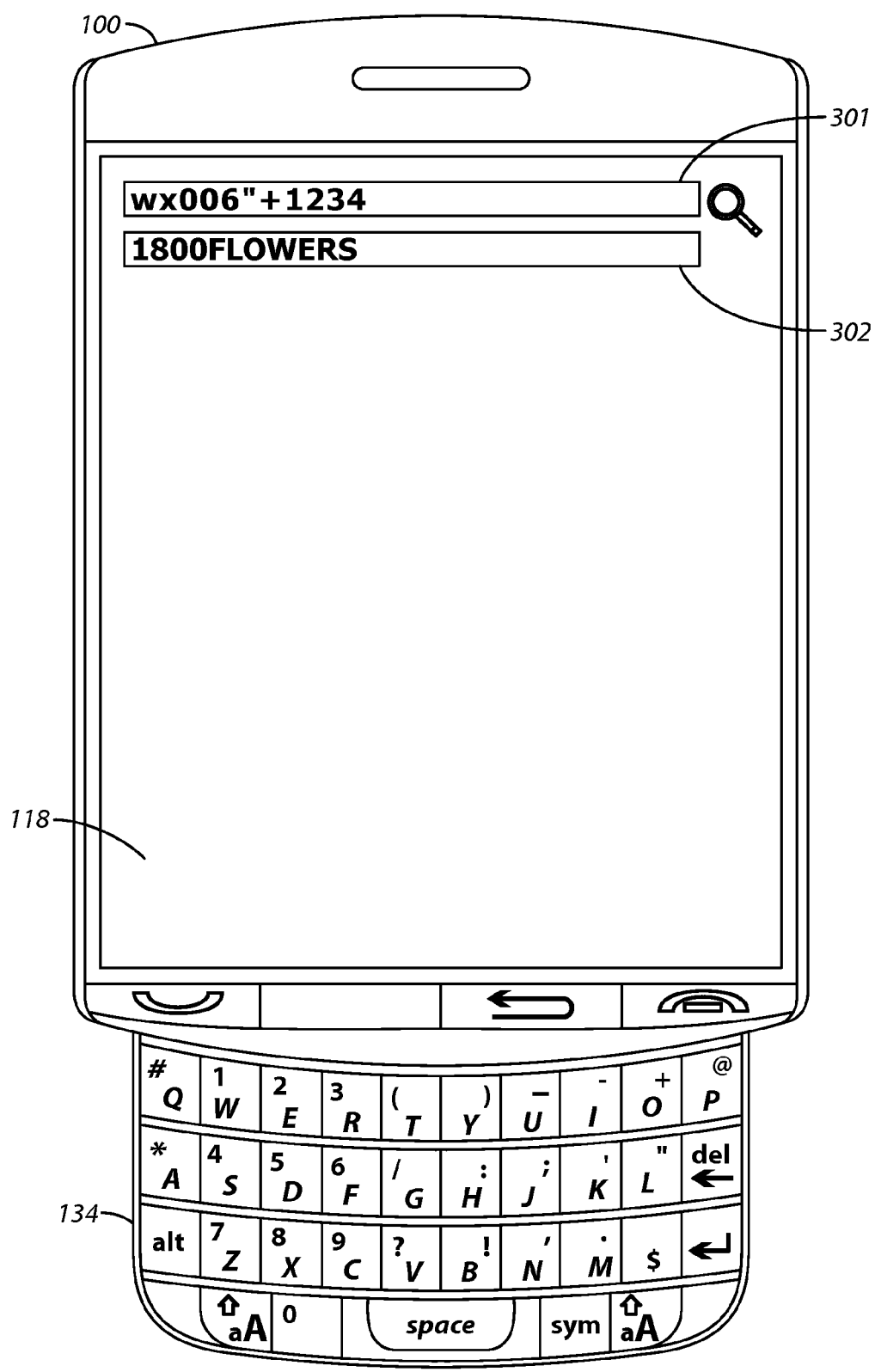
FIG. 8 is a top plan diagram in accordance with the disclosure.

In the example illustrated at FIG. 8 the end user wants to dial the telephone number represented by "1800FLOWERS." In this example the user does not use the "alt" key when entering the first four digits (i.e., wx00, where the last two digits are zeroes rather than upper case letter O's as the end user asserted the single-character zero key for those two characters). After entering these four characters (while intending to enter the numbers "1800") the end user then begins to use the "alt" key while entering the alphabetic characters for "FLOWERS."

In fact, of course, this is exactly the opposite of what the end user should be doing; to explicitly enter the desired telephone number the end user should have used the "alt" key with the first two characters "w" and "x" to specifically indicate a "1" and an "8," respectively, and then not used the "alt" key when entering the alphabetic characters for "FLOWERS." This is, however, a not-unusual example of end-user behavior and the present teachings are able to accommodate such "errors" to nevertheless ascertain the intended telephone number.

In particular, although there is a likelihood advantage accorded to explicit entries (and hence to the explicitly-entered string "wx006"+1234"), at least by the time the end user completes the keying sequence the implicitly interpreted (and buffered) string "1800FLOWERS" presents itself as a considerably more likely telephone number. This is because, at least in part, the particular combination of explicitly-entered characters do not have the appearance/content of either a numeric-only phone number or a partially-numeric and partially-alphabetic phone number. The implicitly-interpreted string "1800FLOWERS," on the other hand, offers a number of features that suggest a likely telephone number.

If, of course, the end user were to use the "alt" key properly in this case to explicitly enter the string "1800FLOWERS," this same likelihood-based logic would again identify the now explicitly-interpreted string "1800FLOWERS" as the dialable telephone number to display. Accordingly, these teachings are able to discern the correct telephone number regardless of whether the end user properly utilizes the character-specification keys of the keyboard.

These teachings are both flexible and highly scalable in practice. By one approach, for example, the disclosed concept can serve to facilitate initiating a communication at a personal communication device such as a cellular telephone by:

receiving an indication of a selection of a key, the key being associated with both an alphabetic character and a non-alphabetic character;

using both explicit and implicit interpretations of the key selection to identify candidate data strings (which may include, for example, using explicit and implicit interpretations of a sequence of key selections to identify the candidate data strings);

using likelihood assessments to identify a presently most-likely data string of the candidate data strings (where the likelihood assessments can be based on a variety of criteria including, for example, identifying the particular keyboard (of a plurality of available keyboards) that includes the selected key); and displaying the presently most-likely data string (as a dialable telephonic expression such as a literal telephone number or a telephone number expressed using one or more alphabetic characters).

These steps can be repeated in response to at least some indications of successive key selections to continue forming an ultimately-dialable telephone number.

The present disclosure may be embodied in other specific forms without departing from its spirit or essential characteristics. The described example embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A method comprising:
at a portable communication device having a display and at least one character-input keyboard having at least some keys that each correspond to at least two differing characters:
simultaneously displaying a first character-entry field that corresponds to a first function and a second character-entry field that corresponds to a second function, which second function is different from the first function;
as one of the keys is asserted, dynamically determining at least a portion of a corresponding character entry to present in the second character-entry field by considering at least one likelihood of at least one interpretation of the key assertion.

2. The method of claim 1 wherein the first character-entry field comprises a search entry text field.

3. The method of claim 1 wherein the second character-entry field comprises a dialable telephone number field.

4. The method of claim 1 wherein the first character-entry field comprises a search entry text field and the second character-entry field comprises a dialable telephone number field.

5. The method of claim 1 further comprising, as the one of the keys is asserted, determining at least a portion of a corresponding character entry to present in the first character-entry field only as an explicit interpretation of the key assertion.

6. The method of claim 1 wherein the at least two differing characters comprise characters selected from at least two of:
alphabetic characters;
numerical characters;
non-alphanumeric characters.

7. An apparatus configured as a portable communication device, comprising:
a display;
at least one character-input keyboard having at least some keys that correspond to at least two differing characters;
a control circuit operably coupled to the display and the at least one character-input keyboard, the control circuit being configured to:
simultaneously display a first character-entry field that corresponds to a first function and a second character-entry field that corresponds to a second function, which second function is different from the first function;
as one of the keys is asserted, dynamically determine at least a portion of a corresponding character entry to present in the second character-entry field by considering at least one likelihood of at least one interpretation of the key assertion.

8. The apparatus of claim 7 wherein the first character-entry field comprises a search entry text field.

9. The apparatus of claim 7 wherein the second character-entry field comprises a dialable telephone number field.

10. The apparatus of claim 7 wherein the first character-entry field comprises a search entry text field and the second character-entry field comprises a dialable telephone number field.

11. The apparatus of claim 7 wherein the control circuit is further configured to, as the one of the keys is asserted, determine at least a portion of a corresponding character entry to present in the first character-entry field only as an explicit interpretation of the key assertion.

12. The apparatus of claim 7 wherein the at least two differing characters comprise characters selected from at least two of:
   alphabetic characters;
   numerical characters;
   non-alphanumeric characters.

13. A non-transitory memory having computer instructions stored therein, which computer instructions, when executed by a processor, cause the processor to:
   simultaneously display a first character-entry field that corresponds to a first function and a second character-entry field that corresponds to a second function, which second function is different from the first function;
   as a key of a character-input keyboard having at least some keys that correspond to at least two differing characters is asserted, dynamically determine at least a portion of a corresponding character entry to present in the second character-entry field by considering at least one likelihood of at least one interpretation of the key assertion.

14. The non-transitory memory of claim 13 wherein the first character-entry field comprises a search entry text field.

15. The non-transitory memory of claim 13 wherein the second character-entry field comprises a dialable telephone number field.

16. The non-transitory memory of claim 13 wherein the first character-entry field comprises a search entry text field and the second character-entry field comprises a dialable telephone number field.

17. The non-transitory memory of claim 13 wherein the computer instructions further cause the processor to, as the key is asserted, determine at least a portion of a corresponding character entry to present in the first character-entry field only as an explicit interpretation of the key assertion.

18. The non-transitory memory of claim 13 wherein the at least two differing characters comprise characters selected from at least two of:
   alphabetic characters;
   numerical characters;
   non-alphanumeric characters.

* * * * *